US009858783B1

(12) United States Patent
Agrawal et al.

(10) Patent No.: US 9,858,783 B1
(45) Date of Patent: Jan. 2, 2018

(54) ACCESS MONITORING SYSTEM FOR MEDICAL KITS

(71) Applicants: Akhil K. Agrawal, Davie, FL (US); Sukrit Agrawal, Miami, FL (US)

(72) Inventors: Akhil K. Agrawal, Davie, FL (US); Sukrit Agrawal, Miami, FL (US)

( * ) Notice: Subject to any disclaimer, the term of this patent is extended or adjusted under 35 U.S.C. 154(b) by 0 days.

(21) Appl. No.: 15/172,469

(22) Filed: Jun. 3, 2016

(51) Int. Cl.
| G08B 13/08 | (2006.01) |
| G08B 13/24 | (2006.01) |
| H04W 4/00 | (2009.01) |
| H04W 4/02 | (2009.01) |
| G06K 9/00 | (2006.01) |
| G06F 3/16 | (2006.01) |

(52) U.S. Cl.
CPC ............ G08B 13/248 (2013.01); G06F 3/16 (2013.01); G06K 9/00255 (2013.01); G08B 13/2454 (2013.01); G08B 13/2462 (2013.01); H04W 4/008 (2013.01); H04W 4/02 (2013.01); H04W 4/021 (2013.01)

(58) Field of Classification Search
CPC ............ G06Q 10/087; G06Q 10/0875; G08B 13/248; G08B 13/2454; G08B 13/2462; H04W 4/008; H04W 4/02; H04W 4/021; G06K 9/00255; G06F 3/16
USPC ......................... 340/541, 545.6, 545.1; 705/2
See application file for complete search history.

(56) References Cited

U.S. PATENT DOCUMENTS

| 7,262,698 | B1* | 8/2007 | Frederick | A61G 12/001 340/545.6 |
| 2004/0046020 | A1* | 3/2004 | Andreasson | A61J 1/14 235/385 |
| 2006/0173712 | A1* | 8/2006 | Joubert | G06F 19/322 705/2 |
| 2007/0145130 | A1* | 6/2007 | Danilewitz | G06Q 10/08 340/572.1 |
| 2010/0245087 | A1* | 9/2010 | Gerner | G07C 9/00111 340/541 |
| 2011/0010275 | A1* | 1/2011 | Hull | G06Q 10/087 340/5.2 |
| 2012/0044054 | A1* | 2/2012 | Hussain | G06K 7/10178 340/10.1 |
| 2014/0138440 | A1* | 5/2014 | D'Ambrosio | G06Q 50/22 235/385 |
| 2015/0324681 | A1* | 11/2015 | Mats | G06K 19/07766 235/492 |

* cited by examiner

Primary Examiner — Thomas Mullen
(74) Attorney, Agent, or Firm — Patents on Demand P.A.; Brian K. Buchheit

(57) ABSTRACT

A medical supply monitoring system for a medical kit monitors supplies of the medical kit. The medical kit can house medical supplies within a container at a user location. At least one medical supply can have an electronic tracking tag affixed thereon. The system can include an access sensor, a client device, and a server. The access sensor can be installed upon a covering element of the monitored compartment to indicate when an access event has occurred. The client device can be installed within the container and connected to the access sensor. The client device can be configured to collect the situational data for the access event. The server can be remotely-located from the client device and can be configured to maintain an access log for the medical kit using the situational data collected by the client device.

20 Claims, 5 Drawing Sheets

ACCESS MONITORING SYSTEM FOR MEDICAL KITS

BACKGROUND

The present invention relates to the field of access monitoring and, more particularly, to an access monitoring system for medical kits.

Medical kits have become commonplace features in a variety of private and public locations, as required by law and/or need. Often, medical kits contain valuable medical supplies and/or devices like the portable automated external defibrillators (AEDs) found in many public buildings. These medical kits are usually accessible to the public for emergency use. However, this also leaves the medical kits open to theft and/or misuse.

That is, locking medical kits in public venues limits access to a subset of people. During an emergency, the time needed to find a person having access to the medical kit could mean the difference between life and death for a person having a medical crisis.

Often, general security measures of the venue, public or private, are adequate to deter improper access or use of the medical kit. However, these systems tend to focus on general areas and not the medical kit, allowing for easy circumventions.

What is needed is a solution that automatically collects image and/or other data when the medical kit is accessed. Such a solution should be capable of maintaining a historical access log that contains the collected data.

BRIEF SUMMARY

One aspect of the present invention can include a medical supply monitoring system that comprises a medical kit and a computing system. The medical kit can house medical supplies within a container at a user location. At least one medical supply can have an electronic tracking tag affixed thereon. The computing-system can be configured to automatically record situational data when a monitored compartment of the medical kit is accessed and/or a medical supply having the electronic tracking tag is removed from or returned to the medical kit. The computing system can further include an access sensor, a client device, and a server. The access sensor can be installed upon a covering element of the monitored compartment to indicate when an access event has occurred for the monitored compartment. The client device can be installed within the container and connected to the access sensor. The client device can be configured to collect the situational data for the access event. The server can be remotely-located from the client device and can be configured to maintain an access log for the medical kit using the situational data collected by the client device.

Another aspect of the present invention can include a medical supply monitoring system that includes a medical kit and a computing system. The medical kit can house medical supplies within a container at a user location. At least one medical supply can have an electronic tracking tag affixed thereon. The computing system can be installed within the container and can be configured to automatically record situational data when a monitored compartment of the medical kit is accessed and/or a medical supply having the electronic tracking tag is removed from or returned to the medical kit.

Yet another aspect of the present invention can include a method that begins with the detection of an access event for a monitored compartment of a medical kit by a computing system installed within the medical kit. The medical kit can house medical supplies. At least one medical supply can have an electronic tracking tag affixed thereon. The medical kit can be situated within a user location. Situational data for an immediate area surrounding the medical kit can be captured. The captured situational data can be recorded as an entry of an access log for the medical kit.

DETAILED DESCRIPTION

Figure 1:
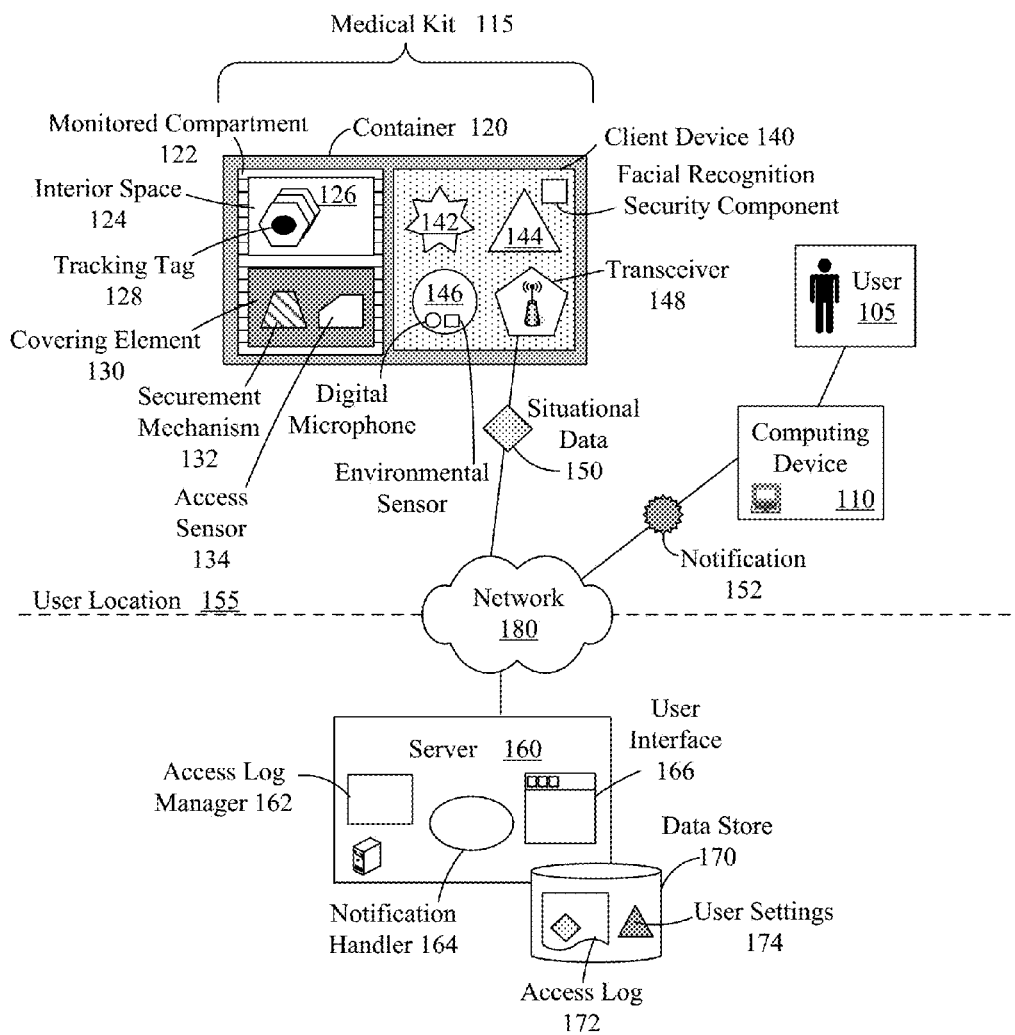
FIG. 1 is a block diagram illustrating a system that utilizes a computing system to record situational data and maintain an access log for a medical kit in accordance with embodiments of the inventive arrangements disclosed herein.

The present invention discloses a solution for monitoring access to a medical kit. A computing system can be installed in a medical kit to monitor one or more compartments. Electronic tracking tags can be affixed to medical supplies, as desired. When a monitored compartment is accessed, the computing system can record situational data for the immediate area of the medical kit. The captured situational data can be recorded in an access log for the medical kit.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a system 100 that utilizes a computing system to record situational data 150 and maintain an access log 172 for a medical kit 115 in accordance with embodiments of the inventive arrangements disclosed herein. System 100 can exemplify an embodiment of a computing system that uses a client-server architecture.

In system 100, a medical kit 115 having a client device 140 can exist at a user location 155. The user location 155 can represent a variety of public/private, indoor/outdoor geographic areas as well as vehicles. Typically, the user location 155 can be a place where having a medical kit 115 is desired or required. Multiple medical kits 115 can be present within the same user location 155.

The user 105 can be a person or group of persons responsible for overseeing or maintaining the medical kit 115; not necessarily the actual person interacting with the medical kit 115 during an emergency. In the case of a personally-owned medical kit 115, the user 105 can be the person interacting with the medical kit 115.

For example, many public spaces like theaters can be required by law to have one or more medical kits 115 available for use in emergency situations. Further, the user location 155 can be owned by a separate entity and rented by the user 105 for a predefined time period like a rental car or hotel room.

As another example, when a personal medical kit 115 is carried by the user 105 in a public venue, the user location 155 can be the location of the user 105 within the public venue.

The medical kit 115 can be a container 120 having one or more compartments 122 that are monitored by the computing system. The container 120 can also include other compartments that are not monitored. The container 120 can be designed in various shapes, sizes, and/or materials.

For example, the container 120 can be a backpack made from a durable water-resistant material having two monitored compartments 122 and three unmonitored compartments. As another example, the container 120 can be a rigid case that has a single monitored compartment 122.

The monitored compartment 122 can have an interior space 124 for storing medical supplies 126. Medical supplies 126 can represent a variety of first aid items for use in health crises. The medical supplies 126 can be consumable or usable only once like an ice pack, pair of latex gloves, bandage, or alcohol wipe. Further, the medical supplies 126 can include reusable medical devices that measure and/or provide a medical service. Examples of a medical device can include, but are not limited to, an automated external defibrillator (AED), a blood pressure cuff, a glucometer, a thermometer, tweezers, shears, and the like.

One or more medical supplies 126 can have an electronic tracking tag 128 affixed to it. The tracking tag 128 can be used to locate the medical supply 126 to which it is affixed as well as store pertinent information. The tracking tag 128 can utilize a variety of technology as taught in the Art, such as BLUETOOTH, radio-frequency identification (RFID), global positioning system (GPS), and the like. It can be recommended that medical supplies 126 of substantial value or import be outfitted with a tracking tag 128.

The interior space 124 of the monitored compartment 122 can be protected by a covering element 130. The form of the covering element 130 can vary depending on the type of compartment 122. For example, in a backpack-like container 120, the monitored compartment 122 can be a zippered pocket and the covering element 130 can be the front flap. In a cabinet-like container 120, the covering element 130 can be the door.

The covering element 130 can include a securement mechanism 132 and an access sensor 134. The securement mechanism 132 can represent the means by which the covering element 130 is closed and/or locked like a zipper or latch.

The access sensor 134 can be an electronic means that provides differing feedback to the client device 140 based on whether the covering element 130 of the monitored compartment 122 is open or closed. The access sensor 134 can, therefore, act as a trigger for the computing system. Examples of an access sensor 134 can include, but are not limited to, a magnetic contact sensor, a wireless proximity sensor, a wireless open/close sensor, a motion sensor, and the like.

The computing system can record situational data 150 regarding medical kit 115 access events. As used herein, the term "access event" can refer to the time a person spends interacting with the medical kit 115. An access event can begin with the opening of the covering element 130 and end when the covering element 130 is returned to the closed state.

In system 100, the computing system can be comprised of the client device 140 and the server 160.

The client device 140 can be an electronic device configured to perform tasks of the computing system local to the medical kit 115. The client device 140 can be attached to or embedded within the container 120. Depending upon the specific implementation, the client device 140 can also be made accessible to a user 105, such as in a resealable pocket, or inaccessible to the user 105 but accessible to a technician.

The client device 140 can include the hardware and/or software necessary to perform its tasks including a client application 142, an electronic tracking system 144, a situational data recorder 146, a transceiver 148, and the like. Additional components (e.g., input/output elements, a GPS module, etc.) can be included in the client device 140 without departing from the spirit of the present invention.

In another embodiment, the client device 140 can have a display that is viewable through a void in a corresponding surface of the container 120; such a void can be covered with a transparent or semi-transparent protective material.

The client application 142 can be a software program that controls operation of the client device 140. The transceiver 148 can represent the means by which the client device 140 wirelessly communicates with the server 160 and/or the user's computing device 110. Multiple transceivers 148 can be required to allow the use of different types of wireless communications networks 180 and/or protocols.

In another contemplated embodiment, the client device 140 can include ports for a hard-wired connection to the network 180, using the transceiver 148 only for communication when the hard-wired connection is unavailable.

The electronic tracking system 144 can be used to determine the location of medical supplies 126 having tracking tags 128. The client device 140 should be positioned in the container 120 in such a manner to provide the electronic tracking system 144 adequate coverage of the area surrounding the medical kit 115. The electronic tracking system 144 can interface with the client application 142. The extent of tracking functions afforded to the client application 142 can vary based on the type of electronic tracking system 144.

For example, a GPS-based electronic tracking system 144 can allow the user 105 to define geo-fence boundaries for a tagged medical supply 126. The client application 142 can then send the user 105 notifications 152 when the medical supply 126 is carried outside these boundaries.

In another embodiment, the electronic tracking system 144 can include ancillary sensors (not shown) that can be installed within the user location 155 to increase coverage of the user location 155.

The situational data recorder 146 can represent the hardware and/or software components required to capture situational data 150 about the access event. While the specific data collection components can vary, it can be recommended that the situational data recorder 146 at least include a digital camera to capture an image of the person accessing the medical kit 115. Example of other data collection components for the situational data recorder 146 can include but are not limited to, a digital microphone, a thermometer, an atmospheric pressure sensor, a radiation sensor, an air quality sensor, a light sensor, a humidity sensor, a biometric sensor, and the like. In an embodiment where the situational data recorder includes a digital microphone, the digital microphone can be for capturing sounds in the immediate area of the medical kit for inclusion in the situational data. In an embodiment where the situational data recorder includes at least one environmental sensor, that at least one environmental sensor captures environmental data for the immediate area of the medical kit for inclusion in the situational data.

The situational data 150 can be collected by the client application 142 and conveyed to the server 160 over the network 180. The server 160 can represent the hardware and/or software necessary to generate and maintain the access log 172 for the medical kit 115. The server 160 can include an access log manager 162, a notification handler 164, a user interface 166, and a data store 170 for storing the access log 172 and user settings 174.

The access log manager 162 can represent the main processing functionality of the server 160. The access log manager 152 can process the situational data 150 received from a client device 140 to extract the specific information necessary to generate an entry in the access log 172. The information to be included in an access log 172 entry can be defined in the user settings 174.

The access log 172 can be a historical collection of situational data 150 collected for access events. The information contained in the access log 172 can be used for other tasks or systems like trend analysis, inventory management, and security. For example, in the case of theft from the medical kit 115, video, image, and/or audio situational data 150 from the access log 172 can be reviewed to help identify those involved.

As another example, the situational data 150 from the access log 172 can be used to understand how the medical kit 115 was used in an emergency situation. This can be particularly beneficial for combating complaints or false accusations.

The user settings 174 can be a variety of user 105 provided information that influences operation of the server 160. Definition of the user settings 174 can utilize the user interface 166 that is accessible by the user 105 on a computing device 110. As is common in the Art, the user interface 166 can represent the means by which the user 105 can interact with the computing system.

When necessary, the access log manager 162 can utilize the notification handler 164 to generate notifications 152. The notification handler 164 can utilize the appropriate information contained in the user settings 174 and/or access log 172 to create the notification 152. Notifications 152 can conform to a variety of electronic communication formats/standards and can be viewed by the user 105 using a suitable computing device 110. The computing device 110 can represent the hardware and/or software components that support the receipt of the notification 152 over the network 180 and presentation of the notification 152 to the user 105.

For example, the user 105 can specify receiving critical notifications 152 as text messages sent to a smartphone and other notifications 152 sent as email messages to be read on a laptop computer.

In another embodiment, the functionality of the server 160 can be integrated into the client device 140.

In yet another embodiment, the client device 140 can include additional security-related components that authenticate or collect information about the person accessing the medical kit 115. For example, the client device 140 can include facial recognition software and a collection of facial images for those persons allowed to access a monitored compartment 122 containing a controlled substance. In one embodiment, the client device 140 includes a facial recognition security component configured to utilize the digital camera to capture an image of a user's face to determine access privileges to one of the medical kit and the at least one monitored compartment of the medical kit, wherein valid user authentication and sufficient access privileges releases a securement mechanism of the covering element, wherein a result determined by the facial recognition security component is included in the situational data.

As another example, the client device 140 can include a fingerprint scanner to collect the fingerprint of the person accessing the medical kit 115. While the fingerprint scan may not prevent the medical kit 115 from being accessed, it can be recorded for use in the case of vandalism or theft. That is, collection of the fingerprint can be required to access the medical kit 115, but the fingerprint is not immediately analyzed to limit access.

As used herein, presented data store 170 can be a physical or virtual storage space configured to store digital information. Data store 170 can be physically implemented in any type of hardware including, but not limited to, a magnetic disk, an optical disk, a semiconductor memory, a digitally encoded plastic memory, a holographic memory, or any other recording medium. Data store 170 can be a stand-alone storage unit as well as a storage unit formed from a plurality of physical devices. Additionally, information can be stored within data store 170 in a variety of manners. For example, information can be stored within a database structure or can be stored within one or more files of a file storage system, where each file may or may not be indexed for information searching purposes. Further, data store 170 can utilize one or more encryption mechanisms to protect stored information from unauthorized access.

Network 180 can include any hardware/software/and firmware necessary to convey data encoded within carrier waves. Data can be contained within analog or digital signals and conveyed though data or voice channels. Network 180 can include local components and data pathways necessary for communications to be exchanged among computing device components and between integrated device components and peripheral devices. Network 180 can also include network equipment, such as routers, data lines, hubs, and intermediary servers which together form a data network, such as the Internet. Network 180 can also include circuit-based communication components and mobile communication components, such as telephony switches, modems, cellular communication towers, and the like. Network 180 can include line based and/or wireless communication pathways.

Figure 2:
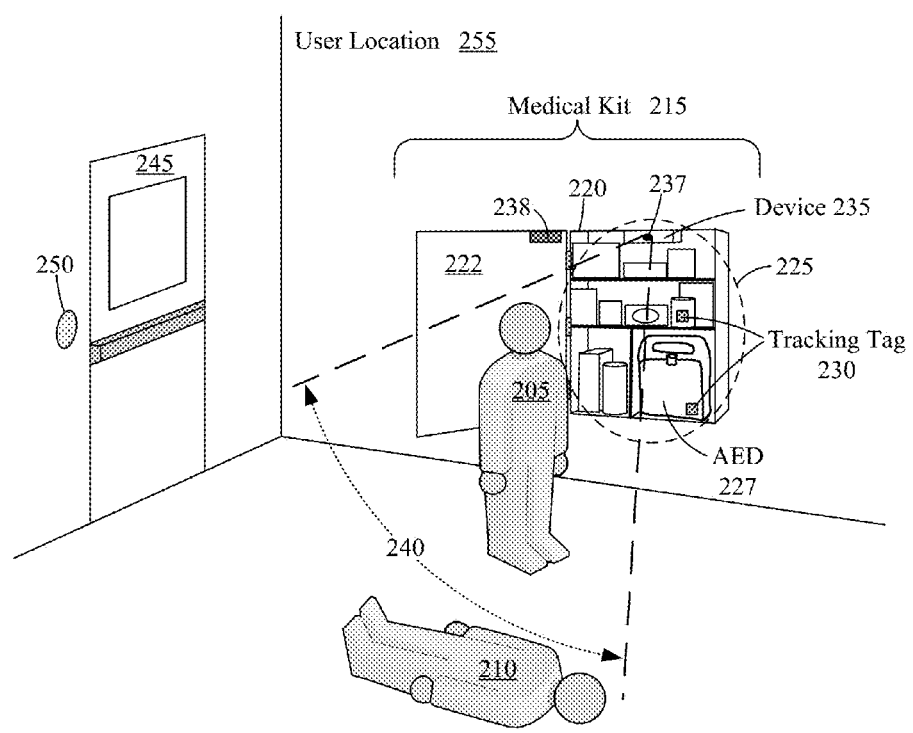
FIG. 2 is an example scenario involving operation of the computing system during an example access event in accordance with embodiments of the inventive arrangements disclosed herein.

FIG. 2 shows an access event 200 depicting operation of the computing system during an example access event in accordance with embodiments of the inventive arrangements disclosed herein. Access event 200 can be performed within the context of system 100.

In access event 200, two persons 205 and 210 can be present in a user location 255 when the second person 210, herein referred to as the impaired person 210, experiences a health crisis. The first person 205, herein referred to as the assisting person 205, can access the medical kit 215 for medical supplies 225 to help the impaired person 210.

In this example, the medical kit 215 can be a rigid case like a medicine cabinet and can be equipped with a device 235 for the computing system. The device 235 can represent the entirety of the computing-system or a client device. Since the medical kit 215 has a single interior space, the entirety of the medical kit 215 can be considered the monitored compartment, as discussed in FIG. 1.

An access sensor 238 for the computing system can be installed upon the door 222 of the medical kit 215. The access sensor 238 can be connected to the device 235 by a wire or through a wireless communications pathway. When the assisting person 205 opens the medical kit door 222, the access sensor 238 can send a signal to the device 235 to indicate that an access event is occurring.

The device 235 can be installed within the interior space of the container 220. Such an installation location can afford a high degree of protection for the device 235. Other placements of the device 235 within or upon the container 220 can be contemplated, provided that the placement is commensurate with collection of the situational data.

Upon receiving indication from the access sensor 238, the device 235 can then trigger components for capturing situational data like the digital camera 237. The digital camera 237 can capture image or video of actions taken around the medical kit 215 that are within its field of view 240. In this example, the digital camera 237 can record the assisting person 205, the impaired person 210, and any other people or objects that enter its field of view 240.

The digital camera 237 used in this example can have a narrow-angle lens. However, in other embodiments, the digital camera 237 can have a wide-angle or fish-eye lens to capture a larger field of view 240. In yet another embodiment, the device 235 can include multiple digital cameras 237, with or without overlapping fields of view 240.

To help the impaired person 210 through the health crisis, the assisting person 205 can be required to use a medical supply 225 having a tracking tag 230 like an automated external defibrillator (AED) 227. Medical supplies 225 considered valuable or needing additional oversight can be outfitted with a tracking tag 230.

The device 235 can utilize the tracking tag 230, along with a corresponding tracking system (not shown), to determine the location of the tagged 230 medical supply 225 within the user location 255. In this example, the tracking system can include perimeter sensors 250 that can be used to locate the medical supply 225 when out of range of the device 235.

For example, the assisting person 205 can remove the AED 227 from the medical kit 215. Instead of tending to the impaired person 210, the assisting person 205 can attempt to steal the AED 227 by exiting the user location 255 through the nearby door 245. As the assisting person 205 carries the AED 227 towards the door 245, the tracking system in the device 235 can lose communication with the tracking tag 230 and activate the perimeter sensors 250.

The perimeter sensor 250 nearest the door 245 can establish communication with the tracking tag 230 of AED 227 and report to the device 235 that the AED 227 is still within the area. However, once the assisting person 205 passes through the door 245, the perimeter sensor 250 can lose contact with the tracking tag 230 and notify the device 235. If none of the perimeter sensors 250 report contact with the tracking tag 230, the device 235 can be configured to sound an alarm, contact security or the authorities, and/or notify a designated agent of the user location 255. Image/video data captured by the device 235 can be used to later identify the assisting person 205.

In another embodiment, the perimeter sensors 250 can be a component of a security system for the user location 255 used by the tracking system.

Figure 3:
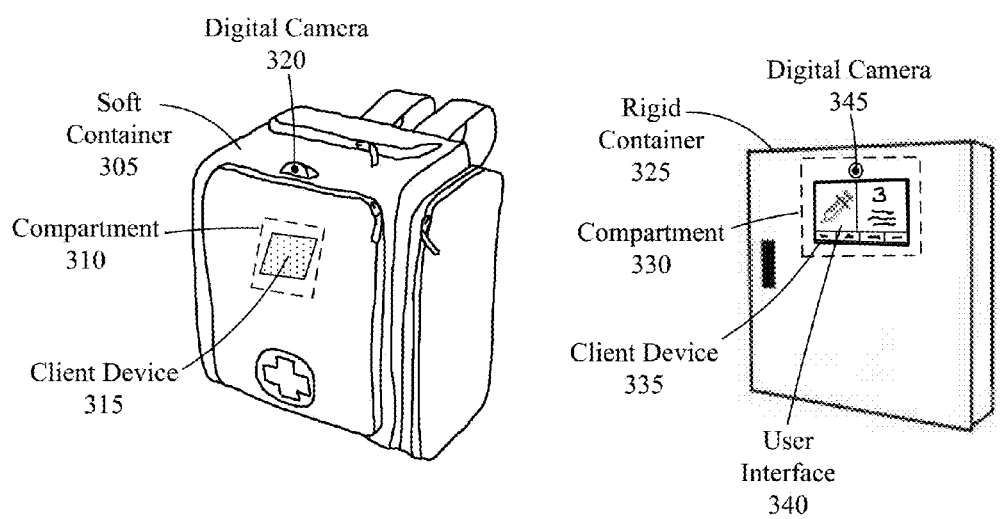
FIG. 3 depicts example medical kits having client devices in accordance with embodiments of the inventive arrangements disclosed herein.

FIG. 3 depicts medical kits 300 having client devices 315 and 335 in accordance with embodiments of the inventive arrangements disclosed herein. The medical kits 300 can be utilized within the context of system 100 and/or access event 200.

Medical kits 300 can include a medical kit that uses a soft container 305 and one that uses a rigid container 325. Both types of containers 305 and 325 can be similar to those currently commercially available.

The soft container 305 can be designed similar to a backpack with multiple zippered pockets and spaces. In this example, the front pouch of the soft container 305 can include a compartment 310 for holding the client device 315. The compartment 310 can be attached to an interior surface of the zippered flap. Alternately, the compartment 310 can exist within the space between interior and exterior layers of the flap.

In this example, the user cannot directly interact with the client device 315. The compartment 310 can still have an open/closure means to allow a technician to service the client device 315.

The container 305 can be modified to accommodate space for the digital camera 320 to have access to the exterior. This configuration can indicate that the client device 315 is to capture image/video data for access events involving the front pouch; image/video data cannot be captured for other pockets of the container 305.

The rigid container 325 can be similar to a medicine cabinet and can be permanently attached to a wall or other structural component. As with the soft container 305, a compartment 330 can be installed upon or within the rigid container 325 to hold the client device 335. In this example, a portion of the rigid container 325 can be removed to allow the user to view/use a user interface 340 for the client application.

It should be noted that the client devices 315 and 335 can be placed in other locations on or in the containers 305 and 325.

Figure 4:
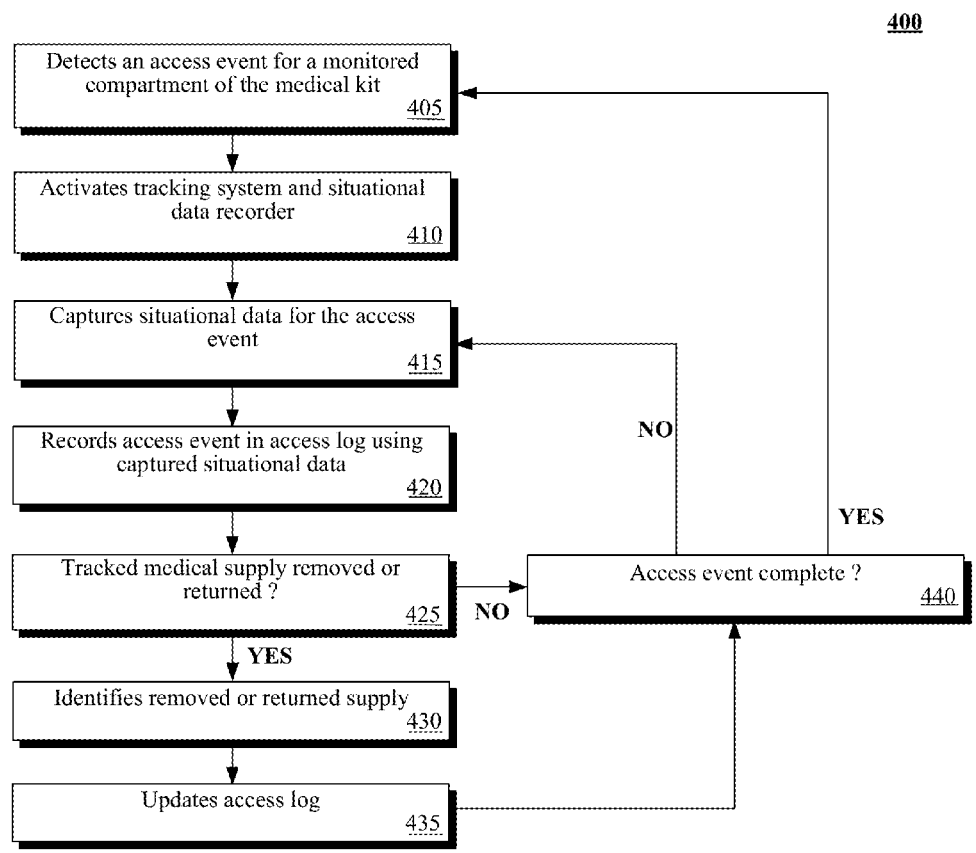
FIG. 4 is a flowchart of a method describing the general operation of the computing system for maintaining an access log for a medical kit in accordance with embodiments of the inventive arrangements disclosed herein.

FIG. 4 is a flowchart of a method 400 describing the general operation of the computing system for maintaining an access log for a medical kit in accordance with embodiments of the inventive arrangements disclosed herein. Method 400 can be performed within the context of system 100, access event 200, and/or utilizing the medical kits 300.

Method 400 can begin in step 405 where the computing system detects an access event for a monitored compartment of the medical kit (i.e., the door/flap of the compartment has been opened). The tracking system and situational data recorder can be activated in step 410. In step 415, situational data can be captured about the access event.

The access event can be recorded in the access log using the captured situational data in step 420. In step 425, it can be determined if a medical supply having a tracking tag has been removed from or returned to the medical kit. The determination of step 425 can be made based on communication between the tracking system and the tracking tag of the medical supply.

When it is determined that a tracked medical supply has not been returned or removed, it can be determined if the access event is complete in step 440. Completion of the access event can be indicated by the access sensor (i.e., the door/flap of the compartment has returned to the closed state). When the access event is complete, flow of method 400 can return to step 405 to handle the next access event that occurs. When the access event is not complete, method 400 can return to step 415 to continue collecting situational data about the access event.

When it is determined that a tracked medical supply has been removed from or returned to the medical kit, the removed or returned supply can be identified in step 430. In step 435, the access log for the access event can be updated to include the return/removal of the tracked medical supply. From step 435, step 440 can execute to determine if the access event is complete.

Figure 5:
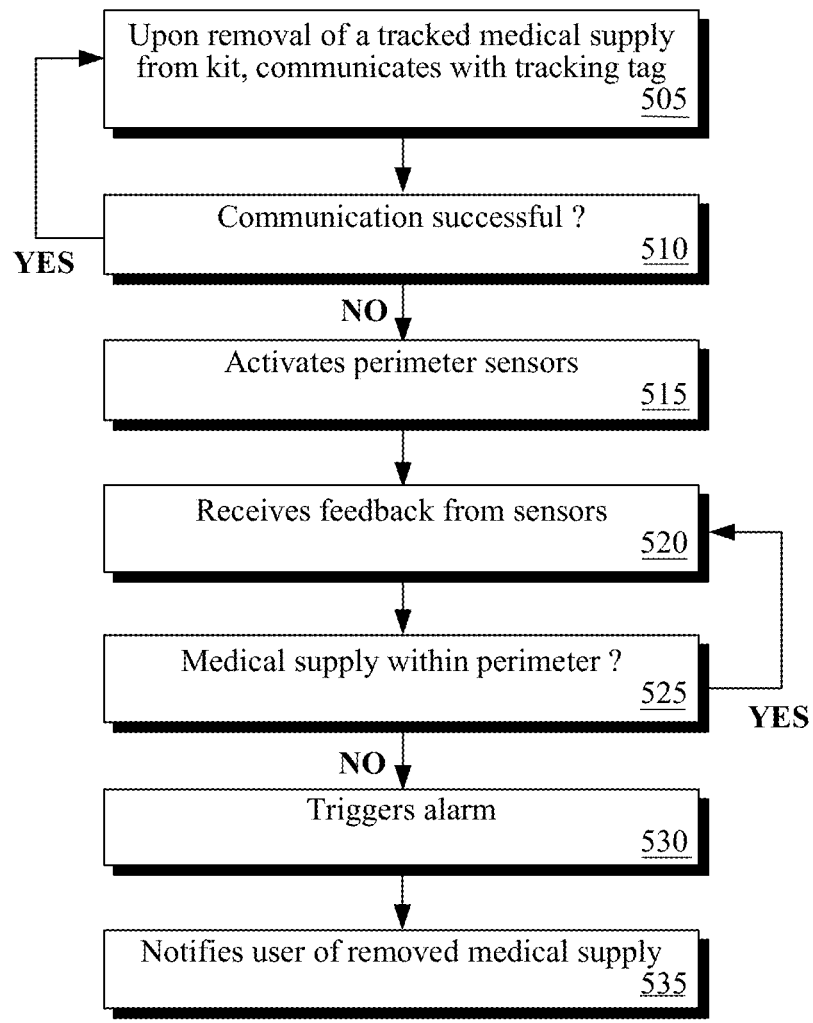
FIG. 5 is a flowchart of a method detailing an example means for tracking a medical supply in accordance with embodiments of the inventive arrangements disclosed herein.

FIG. 5 is a flowchart of a method 500 detailing an example means for tracking a medical supply in accordance with embodiments of the inventive arrangements disclosed herein. Method 500 can be performed within the context of system 100, access event 200, medical kits-300, and/or method 400.

Method 500 can begin with step 505 where, upon removal of a tracked medical supply from the medical kit, the computing system can communicate with the tracking tag of the removed medical supply. Communication between the computing system and the tracking tag can be performed continuously or at predetermined time intervals.

In step 510, it can be determined if the communication with the tracking tag was successful. When communication with the tracking tag is successful, flow of method 500 can return to step 505 to continue communicating with the tracking tag. When communication with the tracking tag is unsuccessful, the perimeter sensors can be activated in step 515.

In step 520, feedback can be received from the perimeter sensors. It can be determined if the tracked medical supply is within the perimeter, defined by the perimeter sensors, in step 525. When the tracked medical supply is within the perimeter, flow of method 500 can return to step 520 to continue monitoring the location of the tracked medical supply.

When the tracked medical supply is not within the perimeter, an alarm can be triggered in step 530. In step 535, the user can be notified of the removed medical supply.

It should be noted that the steps of method 500 can be modified for different tracking technologies. For example, a GPS-based tracking system can utilize geo-fence boundaries instead of perimeter sensors.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A medical supply monitoring system comprising:
   a medical kit housing a plurality of medical supplies within a container, wherein at least one medical supply has an electronic tracking tag affixed thereon, wherein the medical kit is situated within a user location; and
   a computing system configured to automatically record situational data when at least one monitored compartment of the medical kit is accessed and the at least one medical supply having the electronic tracking tag is removed from or returned to the medical kit, wherein said computing system comprises:
      an access sensor installed upon a covering element of the at least one monitored compartment to indicate when an access event has occurred for the at least one monitored compartment;
      a client device installed within the container and connected to the access sensor, wherein said client device is configured to collect the situational data;
      a server, remotely located from the client device, configured to maintain an access log for the medical kit using the situational data collected by the client device.

2. The system of claim 1, wherein the client device further comprises:
   a situational data recorder configured to capture a plurality of data that comprises the situational data, wherein said situational data recorder comprises:
      a digital camera for capturing image or video data of an immediate area of the medical kit for inclusion in the situational data;
   an electronic tracking system configured to wirelessly communicate with the electronic tracking tag to determine a location of the at least one medical supply having the electronic tracking tag affixed thereon;
   at least one means for communicating with the server; and
   a client application configured to control operation of the client device.

3. The system of claim 2, wherein the situational data recorder further comprises:
   a digital microphone for capturing sounds in the immediate area of the medical kit for inclusion in the situational data.

4. The system of claim 2, wherein the situational data recorder further comprises:
   at least one environmental sensor that captures environmental data for the immediate area of the medical kit for inclusion in the situational data.

5. The system of claim 2, wherein the client device further comprises:
   a facial recognition security component configured to utilize the digital camera to capture an image of a user's face to determine access privileges to one of the medical kit and the at least one monitored compartment of the medical kit, wherein valid user authentication and sufficient access privileges releases a securement mechanism of the covering element, wherein a result determined by the facial recognition security component is included in the situational data.

6. The system of claim 1, wherein the client device further comprises:
   a display for presenting data to a user; and
   at least one means for receiving user-inputted data.

7. The system of claim 1, wherein the computing system further comprises:
   a user interface configured to allow a user to configure the computing system and view the access log.

8. The system of claim 1, wherein the server further comprises:
   an access log manager configured to use the situational data to generate entries in the access log; and
   a notification handler configured to generate and convey notifications to a user regarding violations to one of medical kit access and a predefined boundary for the at least one medical supply having the electronic tracking tag affixed thereon.

9. The system of claim 1, wherein the electronic tracking tag utilizes one of BLUETOOTH technology, radio-frequency identification (RFID) technology, and global positioning system (GPS) technology.

10. A medical supply monitoring system comprising:
    a medical kit housing a plurality of medical supplies within a container, wherein at least one medical supply has an electronic tracking tag affixed thereon, wherein the medical kit is situated within a user location; and
    a computing system, installed within the container, configured to automatically record situational data when at least one monitored compartment of the medical kit is accessed and the at least one medical supply having the electronic tracking tag is removed from or returned to the medical kit, wherein the computing system further comprises:
       an access sensor installed upon a covering element of the at least one monitored compartment to indicate when an access event has occurred for the at least one monitored compartment;
       a situational data recorder configured to capture a plurality of data that comprises the situational data, wherein said situational data recorder comprises:
       an electronic tracking system configured to wirelessly communicate with the electronic tracking tag to determine a location of the at least one medical supply having the electronic tracking tag affixed thereon; and
       an access log manager comprising hardware and software configured to record the situational data in an entry of an access log for the medical kit.

11. The system of claim 10, wherein the computing system further comprises:
    a software application configured to execute machine-readable instructions that represent functionality of the computing system; and
    a transmitter for communicating the situational data with a remotely located server,
    wherein said situational data recorder further comprises:
       a digital camera for capturing image or video data of an immediate area of the medical kit for inclusion in the situational data.

12. The system of claim 10, wherein the situational data recorder further comprises:

a digital microphone for capturing sounds in the immediate area of the medical kit for inclusion in the situational data.

13. The system of claim 10, wherein the situational data recorder further comprises:
at least one environmental sensor that captures environmental data for the immediate area of the medical kit for inclusion in the situational data.

14. The system of claim 10, wherein the computing system further comprises:
a software application configured to execute machine-readable instructions that represent functionality of the computing system, wherein the software application comprises:
an access log manager configured to use the situational data to generate entries in the access log;
a notification handler configured to generate and convey notifications to a user regarding violations to one of medical kit access and a predefined boundary for the at least one medical supply having the electronic tracking tag affixed thereon; and
a user interface configured to allow a user to configure the computing system and view the access log.

15. The system of claim 10, wherein the electronic tracking system further comprises:
a plurality of tracking sensors positioned along a perimeter that defines an area that the at least one medical supply having the electronic tracking tag affixed thereon is expected to stay within, wherein said plurality of tracking sensors communicate with the electronic tracking tag and the computing system.

16. The system of claim 10, wherein the electronic tracking tag utilizes one of BLUETOOTH technology, radio-frequency identification (RFID) technology, and global positioning system (GPS) technology.

17. A method comprising:
detecting an access event for a monitored compartment of a medical kit by a computing system installed within the medical kit, wherein said medical kit houses a plurality of medical supplies, wherein at least one medical supply has an electronic tracking tag affixed thereon, wherein the medical kit is situated within a user location;
capturing situational data for an immediate area surrounding the medical kit; and
recording the captured situational data in an entry of an access log for the medical kit.

18. The method of claim 17, further comprising:
monitoring a location of the at least one medical supply having the electronic tracking tag affixed thereon using an electronic tracking system; and
when the location of the at least one medical supply having the electronic tracking tag affixed thereon violates a predetermined boundary, activating an alarm.

19. The method of claim 18, further comprising:
generating a notification regarding the predetermined boundary violation; and
conveying the generated notification to at least one of a designated user and security personnel.

20. The method of claim 19, wherein the notification at least includes the location of the predetermined boundary where the violation occurred and the situational data for the access event that occurred prior to the violation.

* * * * *